Jan. 16, 1968     J. P. TORONCHUK     3,363,910
FLUID MOUNTED SHAFT SEAL
Filed Sept. 10, 1965
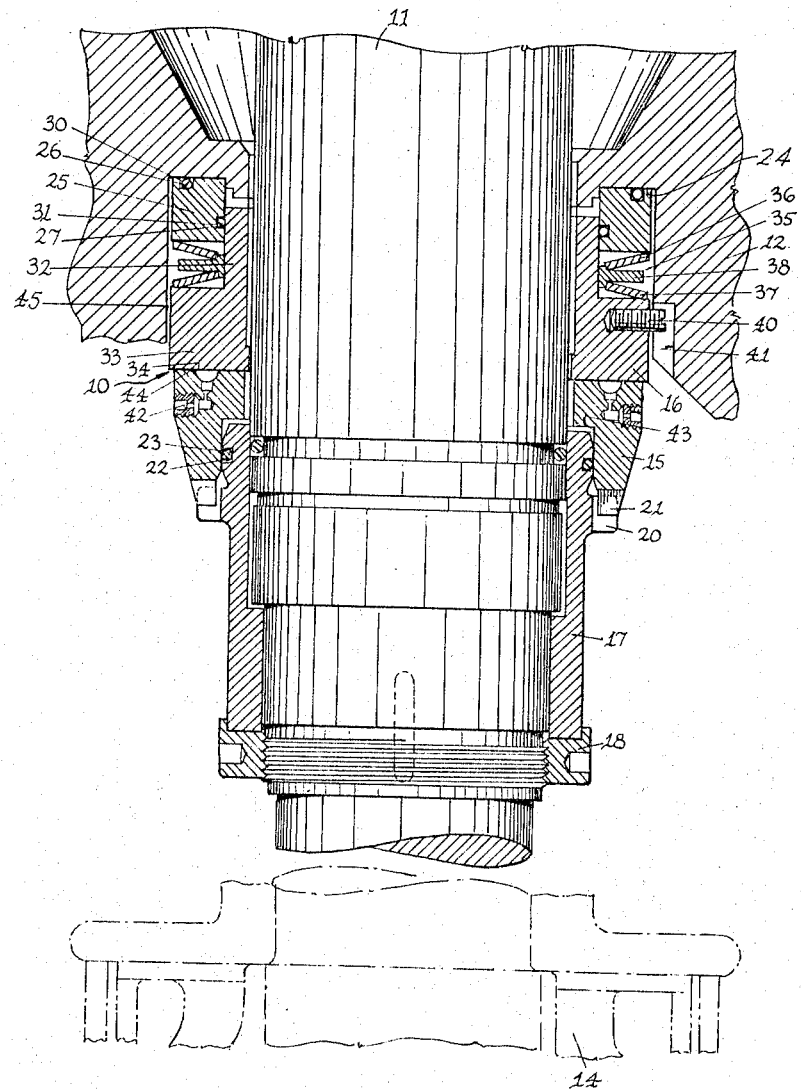
INVENTOR
Jack P. Toronchuk
BY
James G. Ramly
PATENT AGENT

United States Patent Office 3,363,910
Patented Jan. 16, 1968

3,363,910
FLUID MOUNTED SHAFT SEAL
Jack P. Toronchuk, Toronto, Ontario, Canada, assignor to Atomic Energy of Canada Limited, Ottawa, Ontario, Canada, a company under the Atomic Energy Control Act
Filed Sept. 10, 1965, Ser. No. 486,436
Claims priority, application Canada, July 13, 1965, 935,685
3 Claims. (Cl. 277—5)

ABSTRACT OF THE DISCLOSURE

A shaft seal for a high presure pump having a stationary sealing member capable of limiting axial and tilting movement and having a rotary sealing member with an inner cylindrical surface spaced from the shaft and an annular member on the shaft projecting outwards with a sealing ring at its apex engaging the inner cylindrical surface on the rotary sealing member. This permits the rotary sealing member to move longitudinally and tilt with respect to the shaft.

---

This invention relates to high pressure seals for rotating shafts.

It is customary to provide the rotary shaft of a pump with a mechanical seal to prevent the liquid being pumped from leaking out of the pump along the shaft. Such seals usually comprise two engaging collars or sealing members. One sealing member rotates with the shaft and the other is stationary relative to the shaft. The matching or sealing surfaces of the sealing members are pressed together during operation of the pump so that they form a seal.

It is very desirable when the sealing members are installed that they be installed with the sealing surfaces perpendicular to the axis of rotation. A thin film of liquid is normally present between the sealing surfaces during operation and this prevents actual contact between the sealing surfaces. If there is any misalignment caused by tilting error or by deformation of the seal then actual contact may occur between the sealing surfaces over a part of the cycle of rotation of the shaft. This generates unwanted heat as well as causing rapid deterioration of the sealing surfaces.

To avoid misalignment problems, it is known to have one of the sealing members rigidly mounted and the other sealing member mounted to permit not only axial movement, but movement of the plane of the sealing surface with reference to a plane at right angles to the axis of rotation (hereinafter referred to as tilting movement). For example, the rotating sealing member may be fixed to the shaft while the stationary sealing member may be mounted to permit the necessary limited axial and tilting movement and may be spring biased towards the rotating member to form the seal.

These known seals will permit a certain amount of misalignment caused by errors in manufacture or in installation. If both the sealing members could be mounted to permit tilting movement, and preferably to permit both tilting movement and axial movement, then misalignment errors would become less of a problem. Low pressure shaft seals have been developed in which both the sealing members are supported on flexible, hollow, elastic O-rings to provide a degree of axial, lateral and tilting movement to both sealing members. However, this design cannot be applied directly to high pressure seals. Also, it is difficult to determine the distribution of loading forces on the sealing surfaces in such a seal, and being able to determine the distribution and degree of loading is important in evolving a satisfactory seal design.

High pressure seals usually are designed to have one of the sealing members subjected to the high pressure in such a manner that the high pressure is used to force that sealing member towards the opposing sealing member. A sealing member which relies only on the pressure of the fluid to press it towards an opposing sealing member is referred to as a fluid backed seal and may be said to "float." Such a seal has many desirable features. One feature is that the force with which the floating sealing member is urged towards the opposing sealing member bears a relationship to the pressure of the surrounding fluid (i.e., to the fluid being pumped). The higher the pumping pressure, the greater is the sealing force urging the fluid backed sealing member towards the rigid sealing member. Another feature is that the designer of such a seal can calculate the forces involved on the fluid backed seal member and readily determine the loading. Another feature of the fluid backed sealing member or floating member is that it is easily designed to be capable of limited tilting and axial movement. Yet another advantage, and an important one in high pressure pumps is that a fluid backed sealing member is not subject to the deformation of its supporting structure as is a mechanically backed or rigidly mounted sealing member. It should be noted that in a high pressure pump, forces of considerable magnitude are required to press the sealing members together. These forces should be applied or distributed evenly over the sealing members if there is to be no distortion or deformation of the sealing member. Even a very small deformation may affect the sealing surface. With a fluid backed sealing member the forces are distributed hydrostatically and evenly and distortion is kept to a minimum. Where a sealing member is backed by a mechanical engagement with a casing or a spring it is more difficult to ensure that the forces are distributed evenly and no deformation occurs.

It is desirable to use in a high pressure pump, sealing members which are both capable of limited tilting and axial movement, and to use in a high pressure pump sealing members which are both fluid backed or substantially fluid backed. However, it appears no one has designed a high pressure seal which has such features.

It is therefore an object of this invention to provide a high pressure seal of novel design having a rotary sealing member and a stationary sealing member both capable of limited axial and tilting movement.

It is another object of this invention to provide a high pressure seal having one sealing member which is fluid backed and another sealing member which is substantially fluid backed at operating pressures.

These and other objects and advantages of the invention will appear from the following description taken in conjunction with the accompanying drawings in which:

The single figure is a longitudinal sectional view through a high pressure seal according to the invention.

Referring to the drawing, a seal indicated generally as 10 is mounted between a rotary shaft 11 and a casing 12. The casing 12 defines a high pressure chamber in which a pump impeller 14 rotates. The impeller 14, of which only a part is indicated in the drawing in phantom, is secured to and is driven by shaft 11. The opposite end of shaft 11 is arranged to be driven in a suitable manner.

The seal 10 separates the high pressure chamber of the pump from the low pressure portion. That is, the seal prevents leakage along the shaft from a high pressure region to a region where there is a lower pressure. The seal 10 comprises a rotary sealing member 15 which is loosely fastened to and rotates with shaft 11, and a stationary sealing member 16 which is loosely fastened to the interior of casing 12. A shaft sleeve 17 is keyed to shaft 11 and is retained on shaft 11 by a nut 18. Thus the sleeve 17 and nut 18 rotate with shaft 11. The sleeve 17 is provided with one or more slots indicated at 20 while the rotating sealing member 15 is provided with mating lugs 21 which are received in slots 20. The engagement between the walls of slots 20 and lugs 21 causes rotary sealing member 15 to rotate with sleeve 17 and shaft 11. Sleeve 17 has a peripheral groove or slot 22 around the upper end (as shown). The sleeve 17 is bevelled on either side of slot 22 so that the slot 22 is at a slight crest. That is, the shaft sleeve 17 is tapered to a smaller diameter on each side of slot 22. An O-ring 23 in slot 22 prevents leakage of fluid between sleeve 17 and rotary sealing member 15. Because of the bevelling, adjacent slot 22, the sealing member 15 has a degree of tilting movement which does not affect the seal provided by O-ring 23. The sealing member 15 has a limited longitudinal or axial movement in addition to tilting movement.

The casing 12 is provided with a formed recess 24 which holds the stationary sealing member assembly. A back up ring 25 is seated in recess 24 and has a groove or slot 26 extending around an end face thereof and a groove or slot 27 extending around the inner surface thereof. These slots 26 and 27 hold O-rings 30 and 31, respectively. The O-ring 30 is to prevent leakage past the end of back up ring 25, and the O-ring 31 is to prevent leakage between back up ring 25 and stationary sealing member 16.

The sealing member 16 has a cylindrical portion 32 and a larger end portion 33 which terminates in sealing surface 34. The back up ring 25 and the end portion 33 define a spring seating recess 35. This recess 35 is shown with a spring 36, a spring 37 and a spacer 38 mounted therein. While two springs are shown to provide a force urging stationary sealing member 16 away from back up ring 25, it will be apparent that a single spring could be used. A set screw 40, or alternately a pin, is received in the side of end portion 33 of sealing member 16. A slot 41 is provided in the inner wall of casing 12 to receive the end of screw 40. The screw 40 and the walls of slot 41 cooperate to prevent rotary movement of sealing member 16.

The rotary sealing member 15 is shown as having a plurality of orifices 42 extending from the side of sealing member 15 to a terminating sealing surface 44. These orifices provide a self-energizing feature for the seal as is known in the art. However, it is not necessary that there be such orifices for the present invention. The present invention is effective on seals where the sealing members are not provided with such orifices, as well as on self energizing seals as shown in the drawing.

The sealing members 15 and 16 may be made of any material suited to the operating and environmental conditions to be encountered. Such materials and their use in high pressure seals are known and may for example be steel, bronze, carbon or like material.

The operation of a seal assembly according to the invention will now be described with reference to a seal having no self-energizing orifices. With the pump at rest the springs 36 and 37 urge stationary sealing member 16 away from back up ring 25 (downwards in the drawing), and the rotary sealing member 15 may move downwards until shoulder 43 engages the end of shaft sleeve 17. When the pump starts, the pressure begins to build up in the high pressure chamber and exerts a force on the exposed surfaces of the sealing members 15 and 16. In other words, the rotary sealing member 15 has a lateral surface generally opposite to the sealing surface, and this lateral surface is exposed to the increasing pressure. By lateral surface it is intended to mean a surface having a lateral component such that the high pressure acting on the lateral surface results in a force directed towards the stationary sealing member 16 (upwards in the drawing). In other words, the lateral surface on the rotary sealing member has a predetermined area on which the high pressure liquid acts to provide an upwardly directed force.

A portion of the high pressure chamber defined by casing 12 constitutes a constantly open passage 45 leading from the region of the lateral surface on the rotary sealing member 15 to seating recess 35 so that the high pressure also is present in seating recess 35. As was previously explained, the O-ring seals 30 and 31 prevent leakage from the region of seating recess 35. The sealing member 16 also has a lateral surface extending outwardly from cylindrical portion 32 to end portion 33 substantially defining one boundary of seating recess 35. Again, this lateral surface is intended to mean a surface having a lateral component such that the high pressure acting on the lateral surface results in a force directed towards the rotary sealing member 15 (downwards in the drawing).

The sealing members 15 and 16 are made so that the effective lateral surface of sealing member 15 is slightly greater than the effective lateral surface of sealing member 16. This means that the downwardly directed (as in the drawing) force on sealing member 16 resulting from the high pressure is slightly less than the upwardly directed force on sealing member 15 resulting from the same high pressure. In some circumstances, it is convenient to have the difference in lateral surfaces about 5% so that the downwardly directed force is 95% of the upwardly directed force. This percentage may vary widely depending on the circumstances. The springs 36 and 37 make up the 5% difference in force to provide a balance between the upwardly directed and downwardly directed forces.

As the pressure in the pump builds up both the upwardly and downwardly directed forces increase but the upwardly directed force increases slightly more than the downwardly directed force resulting from the fluid pressure. As a result the sealing members 15 and 16 move upwards compressing springs 36 and 37 until the spring force with the downwardly directed pressure created force equals the upwardly directed pressure created force. Perhaps an example will illustrate the operation more clearly.

Suppose a pressure of 100 p.s.i. is present in the high pressure chamber and that the area of the seal 16, which when subject to this pressure provides the downwardly directed sealing force, is 4.75 sq. in., while the area of seal 15 which when subject to this pressure provides the upwardly directed sealing force is 5.00 sq. in. Then the pressure causes a downward force of 475 lbs. and an upward force of 500 lbs. The springs 36 and 37 are compressed to provide the balance of 25 lbs. and the seal is in equilibrium. If the pressure should increase to 1000 p.s.i., this new pressure would result in a downward force of 4750 lbs. and an upward force of 5000 lbs. The sealing members 15 and 16 will both move upwards and springs 36 and 37 will be further compressed until they provide a downwardly directed force on sealing member 16 of 250 lbs. The seal is then in equilibrium at the new pressure.

It will be seen that the sealing members move axially to maintain equilibrium and that they are both capable of tilting movement to maintain an even satisfactory seal. The rotary sealing member 15 is entirely fluid backed while the stationary sealing member is substantially fluid backed (perhaps of the order of 95% or more) to keep any deformation of the accurately machined sealing surfaces to a minimum.

Liquid at high pressure is available at the outer side (farthest from the shaft) of sealing members 15 and 16. That is, liquid at high pressure is present during operation of the pump at the outer side of the seal where sealing surfaces 44 and 34 terminate. A thin film of the liquid between sealing surfaces 44 and 34 not only lubricates these surfaces but provides a force keeping the surfaces from actual contact. In the self-energizing seal, shown in the drawing, orifices 42 provide a restricted path for liquid to the sealing surfaces to promote initial flow and lubrication between the sealing surfaces as is well known.

It is believed the present invention provides a high pressure seal having improved means for automatic adjustment of the sealing surfaces and having sealing members at least substantially fluid backed.

I claim:

1. In a shaft seal for a high pressure pump, a housing defining a high pressure chamber, a rotary shaft extending into said housing and having a portion of a first diameter, a rotary sealing member having an inner right cylindrical surface of a second diameter greater than said first diameter positioned over said portion of said shaft, means extending outwardly from said portion of said shaft and having at its outward extremity an annular apex adjacent said inner cylindrical surface, resilient sealing means mounted in said apex engaging said inner cylindrical surface to form a seal permitting longitudinal movement and tilting movement about said apex of said rotary sealing member with respect to said shaft, keying means engaging said shaft and said rotary sealing member for causing said rotary sealing member to rotate with said shaft and permitting longitudinal and tilting movement of said rotary sealing memebr with respect to said shaft, said rotary sealing member having a sealing surface at one end thereof defining a plane substantially at right angles to the axis of said inner cylindrical surface and having towards the other end thereof a first lateral surface exposed to said high pressure chamber, a stationary sealing member positioned over said shaft and having a sealing surface at one end thereof defining a plane substantially at right angles to its axis and having part way towards the other end therof a second lateral surface exposed to said high pressure chamber, the sealing surface of said stationary sealing member being positioned adjacent and facing the sealing surface of said rotary sealing member, resilient sealing means engaging the walls of said housing and the other end of said stationary sealing member to form a seal, keying means engaging said housing and said stationary sealing member for preventing rotation of said stationary sealing member, the area of said second lateral surface being less than the area of said first lateral surface providing a resultant force caused by the pressure in said high pressure chamber in a direction towards the stationary sealing member, and spring means engaging said housing and said stationary sealing member providing on said stationary sealing member a force equal to said resultant force responsive to compression of said spring means by said resultant force.

2. In a shaft seal for a high pressure pump, a housing defining a high pressure chamber, a rotary shaft extending into said housing and having a portion of a first diameter, a rotary sealing member having an inner right cylindrical surface of a second diameter greater than said first diameter positioned over said portion of said shaft, annular means secured to said portion of said shaft and extending outwardly to form at its outward extremity an apex adjacent said inner cylindrical surface, and having a peripheral groove at said apex, a resilient sealing ring mounted in said groove and projecting therefrom to engage said inner cylindrical surface forming a seal permitting longitudinal movement and limited tilting movement about said apex of said rotary sealing member with respect to said shaft, keying means engaging said shaft and said rotary sealing member for causing said rotary sealing member to rotate with said shaft and permitting limited longitudinal and tilting movement of said rotary sealing member with respect to said shaft, said rotary sealing member having a sealing surface at one end thereof defining a plane substantially at right angles to the axis of said inner cylindrical surface and having towards the other end thereof a first lateral surface exposed to said high pressure chamber, a stationary sealing member positioned over said shaft and having a sealing surface at one end thereof defining a plane substantially at right angles to its axis and having part way towards the other end thereof a second lateral surface exposed to said high pressure chamber, the sealing surface of said stationary sealing member being positioned adjacent and facing the sealing surface of said rotary sealing member, resilient sealing means engaging the walls of said housing and the other end of said stationary sealing member to form a seal, keying means engaging said housing and said stationary sealing member for preventing rotation of said stationary sealing member, the area of said second lateral surface being less than the area of said first lateral surface providing a resultant force caused by the pressure in said high pressure chamber in a direction towards the stationary sealing member, and spring means engaging said housing and said stationary sealing member providing on said stationary sealing member a force equal to said resultant force responsive to compression of said spring means by said resultant force.

3. In a shaft seal for a high pressure pump having a housing defining a high pressure chamber, a rotary shaft extending into said housing, a stationary sealing member positioned on said shaft having a sealing surface at one end thereof defining a plane substantially at right angles to the axis of said shaft and having at least part way towards the other end therof a first lateral surface, resilient means providing a seal between said housing and said stationary sealing member while permitting limited axial and tilting movement, spring means engaging said housing and said stationary sealing member to provide a force in a first axial direction, a rotary sealing member positioned on a portion of said shaft having a sealing surface at one end thereof adjacent to and facing the sealing surface on said stationary sealing member and having towards the other end thereof a second lateral surface, the improvement comprising said rotary sealing member having an inner right cylindrical surface of a diameter greater than the diameter of said portion of said shaft, means extending outwardly from said portion of said shaft and having at its outward extremity an annular apex adjacent said inner cylindrical surface, and resilient sealing means mounted in said apex engaging said inner cylindrical surface to form a seal permitting longitudinal and tilting movement of said rotary sealing member with respect to said shaft, said first and second lateral areas both being exposed to the high pressure chamber providing fluid backing for said rotary and stationary sealing members, the area of said first lateral surface being less than the area of said second lateral surface whereby pressure in said high pressure chamber presses the sealing surface on said rotary and stationary sealing members together with a net resultant force in a second axial direction opposite said first direction and said force in said first direction matching said net resultant force.

References Cited

UNITED STATES PATENTS

| | | | |
|---|---|---|---|
| 2,479,265 | 8/1949 | Roshong | 277—27 |
| 2,639,204 | 5/1953 | Terry | 277—91 X |
| 3,239,232 | 3/1966 | Andresen | 277—5 |

SAMUEL ROTHBERG, *Primary Examiner.*